(12) United States Patent
Scheid et al.

(10) Patent No.: US 8,792,705 B2
(45) Date of Patent: Jul. 29, 2014

(54) SYSTEM AND METHOD FOR AUTOMATED DEFECT DETECTION UTILIZING PRIOR DATA

(75) Inventors: Paul Raymond Scheid, West Hartford, CT (US); Richard C. Grant, Ellington, CT (US); Alan Matthew Finn, Hebron, CT (US); Hongcheng Wang, Vernon, CT (US); Ziyou Xiong, Wethersfield, CT (US)

(73) Assignee: United Technologies Corporation, Hartford, CT (US)

(*) Notice: Subject to any disclaimer, the term of this patent is extended or adjusted under 35 U.S.C. 154(b) by 354 days.

(21) Appl. No.: 13/288,576

(22) Filed: Nov. 3, 2011

(65) Prior Publication Data

US 2013/0114878 A1    May 9, 2013

(51) Int. Cl.
    *G06K 9/00*    (2006.01)
(52) U.S. Cl.
    USPC .......................................... 382/141; 382/145
(58) Field of Classification Search
    USPC ........ 382/141, 145; 348/85, E07.085, 82, 92, 348/86, 45, 47, 68, 46, 76, 69; 600/109, 600/118, 166, 178
    See application file for complete search history.

(56) References Cited

U.S. PATENT DOCUMENTS

| | | | |
|---|---|---|---|
| 4,803,639 A * | 2/1989 | Steele et al. .............. 702/40 |
| 5,070,401 A | 12/1991 | Salvati et al. | |
| 5,619,429 A | 4/1997 | Aloni et al. | |
| 5,774,212 A | 6/1998 | Corby | |
| 6,153,889 A | 11/2000 | Jones | |
| 6,362,875 B1 | 3/2002 | Burkley | |
| 6,424,733 B2 | 7/2002 | Langley | |
| 7,099,078 B2 | 8/2006 | Spencer | |
| 7,183,764 B2 * | 2/2007 | Goldfine et al. .............. 324/238 |
| 7,432,505 B2 * | 10/2008 | Brummel ....................... 250/332 |
| 7,489,811 B2 | 2/2009 | Brummel et al. | |
| 7,518,632 B2 * | 4/2009 | Konomura ....................... 348/65 |
| 7,564,626 B2 | 7/2009 | Bendall et al. | |
| 7,619,728 B2 | 11/2009 | Ogburn et al. | |
| 7,656,445 B2 | 2/2010 | Heyworth | |
| 7,758,495 B2 | 7/2010 | Pease et al. | |
| 8,314,834 B2 * | 11/2012 | Konomura ....................... 348/65 |
| 2002/0128790 A1 | 9/2002 | Woodmansee | |
| 2003/0063270 A1 | 4/2003 | Hunik | |
| 2004/0124834 A1 * | 7/2004 | Goldfine et al. .............. 324/243 |
| 2004/0183900 A1 * | 9/2004 | Karpen et al. .................. 348/92 |
| 2004/0242961 A1 | 12/2004 | Bughici | |
| 2005/0016857 A1 | 1/2005 | Kovarsky et al. | |
| 2005/0129108 A1 | 6/2005 | Bendall et al. | |
| 2006/0050983 A1 | 3/2006 | Bendall et al. | |

(Continued)

FOREIGN PATENT DOCUMENTS

WO    WO 2010/020338 A1    2/2010

*Primary Examiner* — Sheela Chawan
(74) *Attorney, Agent, or Firm* — Miller, Matthias & Hull LLP

(57) ABSTRACT

A system and method for performing automated defect detection by utilizing data from prior inspections is disclosed. The system and method may include providing a image capture device for capturing and transmitting at least one current image of an object and providing a database for storing at least one prior image from prior inspections. The system and method may further include registering the at least one current image with the at least one prior image, comparing the registered at least one current image with the at least one prior image to determine a transformation therebetween and updating the database with the at least one current image.

20 Claims, 2 Drawing Sheets

(56) References Cited

U.S. PATENT DOCUMENTS

2011/0013846 A1 1/2011 Hori
2011/0025844 A1 2/2011 Hori
2011/0026805 A1 2/2011 Hori

* cited by examiner

SYSTEM AND METHOD FOR AUTOMATED DEFECT DETECTION UTILIZING PRIOR DATA

TECHNICAL FIELD OF THE DISCLOSURE

The present disclosure relates to automated inspection techniques and, more particularly, relates to automated visual inspection techniques of images or videos captured by image capture devices such as borescopes.

BACKGROUND OF THE DISCLOSURE

Video inspection systems, such as borescopes, have been widely used for capturing images or videos of difficult-to-reach locations by "snaking" image sensor(s) to these locations. Applications utilizing borescope inspections include aircraft engine blade inspection, power turbine blade inspection, internal inspection of mechanical devices and the like.

A variety of techniques for inspecting the images or videos provided by borescopes for determining defects therein have been proposed in the past. Most such techniques capture and display images or videos to human inspectors for defect detection and interpretation. Human inspectors then decide whether any defect within those images or videos exists. These techniques are prone to errors resulting from human inattention. Some other techniques utilize automated inspection techniques in which most common defects are categorized into classes such as leading edge defects, erosion, nicks, cracks, or cuts and any incoming images or videos from the borescopes are examined to find those specific classes of defects. These techniques are thus focused on low-level feature extraction and to identify damage by matching features. Although somewhat effective in circumventing errors from human involvement, categorizing all kinds of blade damage defects within classes is difficult and images having defects other than those pre-defined classes are not detected.

Accordingly, it would be beneficial if an improved technique for performing defect detections were developed.

SUMMARY OF THE DISCLOSURE

In accordance with one aspect of the present disclosure, a method of performing automated defect detection by utilizing prior inspection data is disclosed. The method may include providing an image capture device for capturing and transmitting at least one current image of an object and providing a database for storing at least one prior image from prior inspections. The method may further include registering the at least one current image with the at least one prior image, comparing the registered at least one current image with the at least one prior image to determine a transformation therebetween and updating the database with the at least one current image.

In accordance with another aspect of the present disclosure, a system for performing automated defect detection is disclosed. The system may include an image capture device for capturing and transmitting current images of one or more components of a machine and a database for storing prior images of the one or more components from prior inspections. The system may also include a monitoring and analysis site in at least indirect communication with the image capture device and the database, the monitoring and analysis site capable of retrieving prior images from the database and comparing those images with the current images of the same one or more components to determine a transformation therebetween.

In accordance with yet another aspect of the present disclosure, method of performing automated defect detection is disclosed. The method may include providing an image capture device capable of capturing and transmitting at least one current image of one or more blades of an engine and providing a database capable of storing at least one prior image of the one or more blades of the engine from prior inspections. The method may also include accessing the database to retrieve the at least one prior image corresponding to the at least one current image, registering the at least one current image to the at least one prior image and comparing the registered at least one current image to the at least one prior image. The method may further include updating the database with the at least one current image.

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents falling within the spirit and scope of the present disclosure.

DETAILED DESCRIPTION OF THE DISCLOSURE

Figure 1:
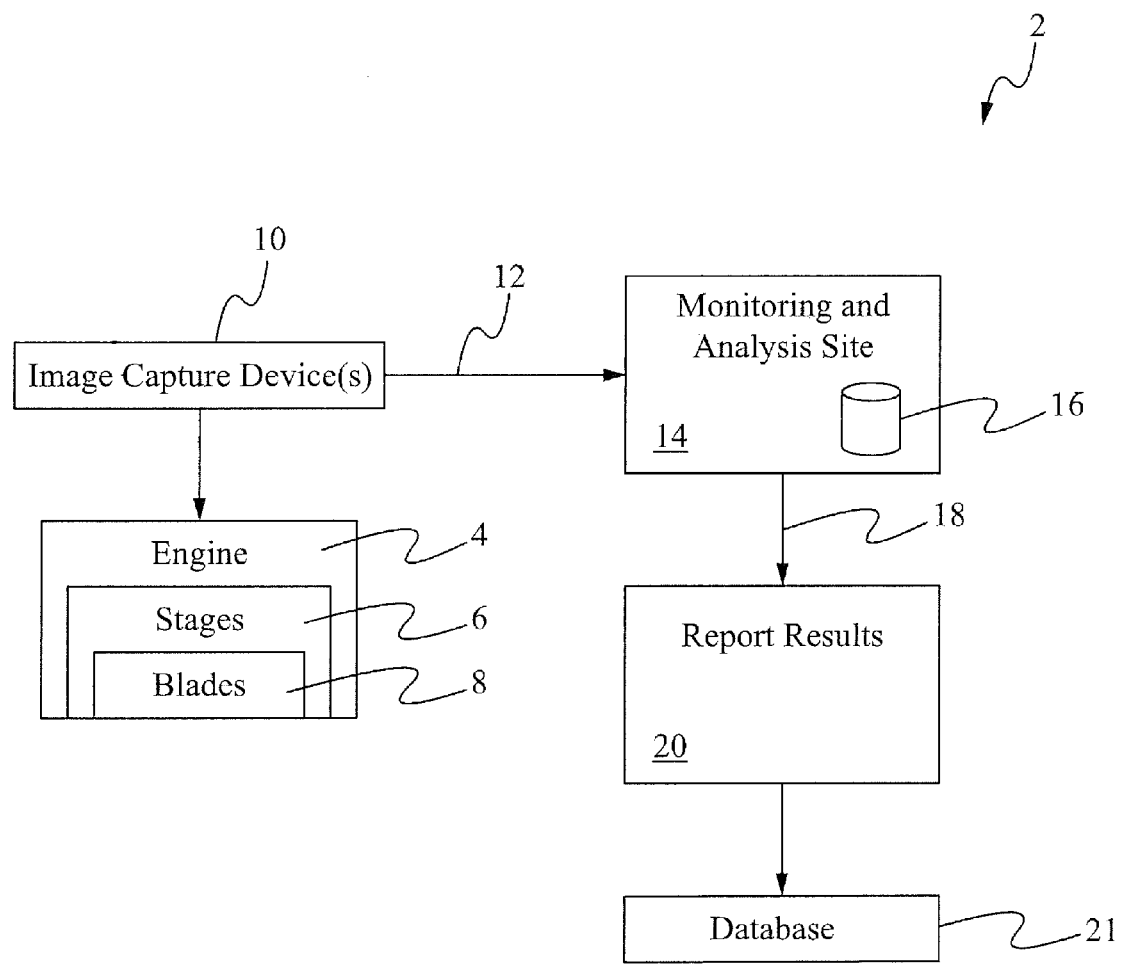
FIG. 1 is a schematic illustration of an automated defect detection system, in accordance with at least some embodiments of the present disclosure.

Referring to FIG. 1, a schematic illustration of an automated defect detection system 2 is shown, in accordance with at least some embodiments of the present disclosure. In at least some embodiments, the automated defect detection system 2 may be an automated borescope inspection (ABI) system. As shown, the automated defect detection system 2 may include an engine 4 having a plurality of stages 6, each of the stages having a plurality of blades 8, some or all of which may require visual inspection periodically or at predetermined intervals by one or more image capture devices 10. The engine may be representative of a wide variety of engines such as jet aircraft engines, aeroderivative industrial gas turbines, steam turbines, diesel engines, automotive and truck engines, and the like. Notwithstanding the fact that the present disclosure has been described in relation to visual inspection of the blades 8 of the engine 4, in other embodiments, the ABI system 2 may be employed to inspect other parts of the engine inaccessible by other means, as well as to perform inspection in other equipment and fields such as medical endoscope inspection, inspecting critical interior surfaces in machined or cast parts, forensic inspection, inspection of civil structures such as buildings bridges, piping, etc.

The image capture device(s) 10 may be an optical device having an optical lens or other imaging device or image sensor at one end and capable of capturing and transmitting still images or video images (referred hereinafter to as "data") through a communication channel 12 to a monitoring and analysis site 14. The image capture device(s) 10 may be representative of any of a variety of flexible borescopes or fiberscopes, rigid borescopes, video borescopes or other devices such as endoscopes, which are capable of capturing and transmitting data of difficult-to-reach areas through the communication channel 12. The communication channel 12 in turn may be an optical channel or alternatively, may be any other wired, wireless or radio channel or any other type of channel capable of transmitting data between two points including links involving the World Wide Web (www) or the internet.

With respect to the monitoring and analysis site 14, it may be located on-site near or on the engine 4, or alternatively, it may be located on a remote site away from the engine. Furthermore, the monitoring and analysis site 14 may include one or more processing systems 16 (e.g., computer systems having a central processing unit and memory) for recording, processing and storing the data received from the image capture device(s) 10, as well as personnel for controlling operation of the one or more processing systems. Thus, the monitoring and analysis site 14 may receive data of the blades 8 captured and transmitted by the image capture device(s) 10 via the communication channel 12. Upon receiving the data, the monitoring and analysis site 14 and, particularly, the one or more processing systems 16 may process that data to determine any defects within any of the blades 8. Results (e.g., the defects) 20 may then be reported through communication channel 18. In addition to reporting any defects in any of the blades 8, the results 20 may also relay information about the type of defect, the location of the defect, size of the defect, etc. If defects are found in any of the inspected blades 8, alarm(s) to alert personnel or users may be raised as well.

Similar to the communication channel 12, the communication channel 18 may be any of variety of communication links including, wired channels, optical or wireless channels, radio channels or possibly links involving the World Wide Web (www) or the internet. It will also be understood that although the results 20 have been shown as being a separate entity from the monitoring and analysis site 14, this need not always be the case. Rather, in at least some embodiments, the results 20 may be stored within and reported through the monitoring and analysis site 14 as well. Furthermore, in at least some embodiments, the results 20 may be stored within a database 21 for future reference that along with, or in addition to another one of the database 21, may be employed for performing the automated defect detection by the monitoring and analysis site 14, as described below with respect to FIG. 2.

Figure 2:
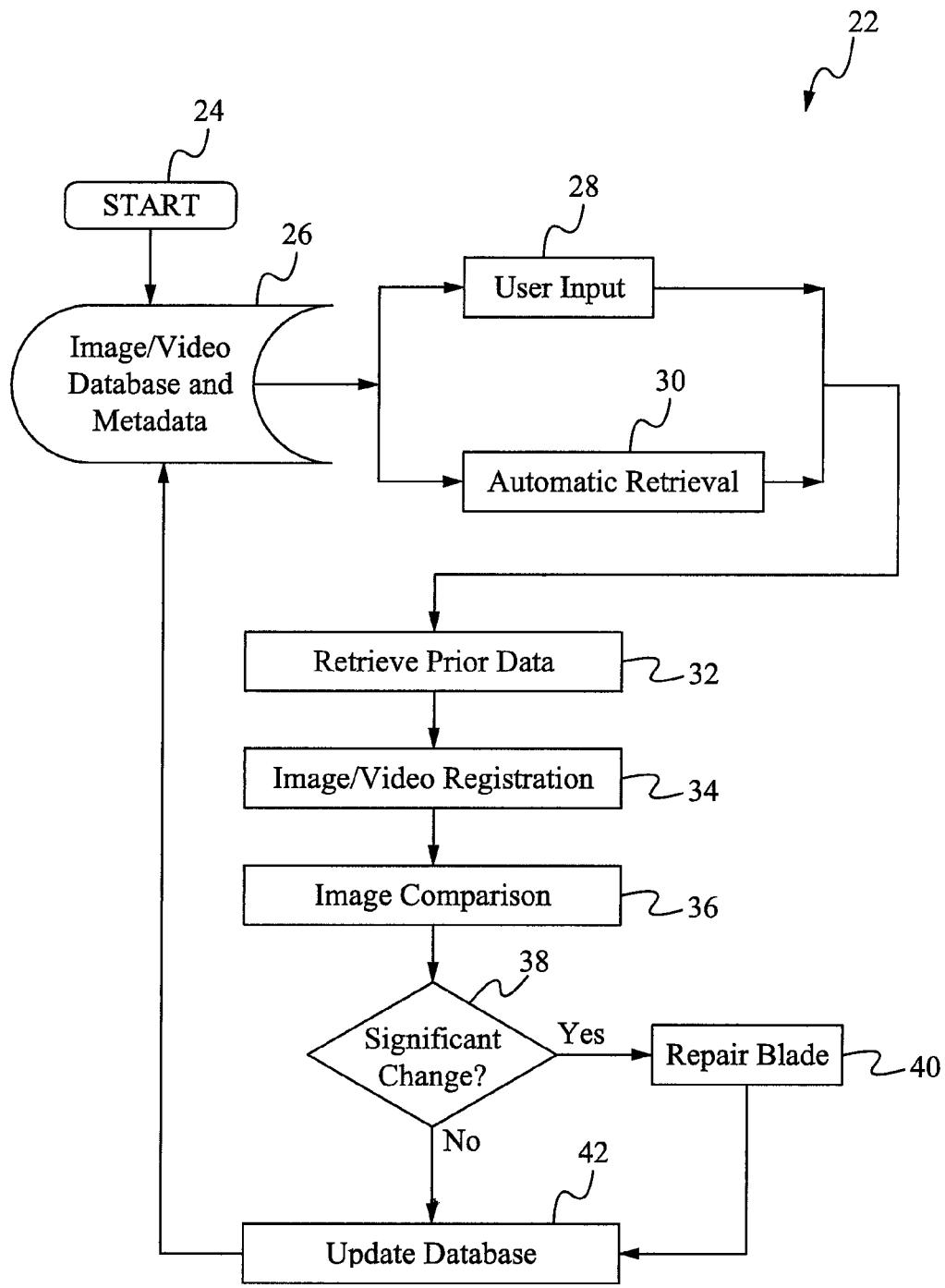
FIG. 2 is a flowchart outlining steps of performing automated defect detection by utilizing prior data and using the automated defect detection system of FIG. 1, in accordance with at least some embodiments of the present disclosure.

Referring now to FIG. 2, a flowchart 22 outlining sample steps which may be followed in performing automated defect detection using the automated defect detection system 2 by utilizing prior data is shown, in accordance with at least some embodiments of the present invention. As shown, after starting at a step 24, the process may proceed to a step 26, where the database (or databases) 21 may be accessed. Specifically, and as mentioned above, defect detection of the engine 4 may be performed periodically, for example, after the engine has been in service for a specific amount of time or after the engine has been operational in certain environmental conditions. For each round of inspection performed on the engine 4, a set of maintenance data or metadata (e.g., defects, type, size and location of defects, etc.) or comments for that inspection may be recorded within the database 21.

By utilizing the database 21 with prior information about any defects within any of the blades 8 within any of the stages 6, future (or current) inspection of those blades may be facilitated by utilizing the prior data as reference. For purposes of explanation, in the present disclosure, the images (or videos) of the one or more blades 8 that are currently (or in the future) undergoing inspection are referred to as "current image (or video)," while the images (or videos) accessed from the database 21 pertaining to prior inspection data are referred to as "prior image (or video)." Thus, a currently obtained still image (or video) of one or more of the blades 8 may be compared with a previously recorded or prior image (or video) of the same blade(s) to identify changes between the two images, thereby identifying the changes between those blades. If a defect appears in the same location of the current image (or video) of the blade(s) 8 as in the previous inspection, then by comparing the current image (or video) of those blade(s) with the prior image (or video) of those blade(s) in the last inspection, it may be determined whether the defect is getting any worse. It will be understood that information stored within the database 21 need not always pertain to defects in the one or more blades 8. Rather, in at least some embodiments, along with defect information, the database 21 may store information regarding undamaged ones of the blades 8 as well.

Thus, at the step 26, the database 21 with the prior inspection data may be accessed. As stated in steps 28 and 30, the database 21 may be accessed manually by an inspector or user or alternatively, the database may be accessed automatically by utilizing an image (or video) retrieving tool, respectively. Specifically, at the step 28, prior inspection data pertaining to one or more of the blades 8 may be accessed by inputting information manually to identify those blades. For example, in at least some embodiments, information specifying the specific one of the engine 4, a model number of the engine 4, and/or a stage number may be input by a user or an inspector. In other embodiments, other types of inputs, such as blade type, etc. may be input as well.

Relatedly, at the step 30, an automatic image retrieval system may be employed to find corresponding information for the current image (or video) within the database 21. In this case, the current images (or videos) may be directly input into the automatic image retrieval system to retrieve the corresponding prior images (or videos) of those blade(s) 8 from the database 21. In at least some embodiments, commonly known video or image searching and retrieval techniques may be employed. In addition to manually or automatically accessing and retrieving information from the database 21, in at least some embodiments, a combination of the aforementioned two methods may be employed as well.

It will also be understood that in some embodiments, multiple prior images (or videos) corresponding to one current image (or video) may be stored within the database 21. When accessing such multiple prior images (or videos), all of the images (or videos) corresponding to the one current image (or video) may be retrieved in some embodiments, while in certain other embodiments, only the most recent one of the prior image (or video) may be retrieved. Similarly, in some embodiments, a blade (or multiple blades) that have never undergone inspection may not find any corresponding prior images (or videos) within the database 21. Upon inspection, images (or videos) of such blades may be stored within the database 21 for any future inspections of those blades. Moreover, the current and/or the prior images (or videos) may correspond to a single one of the blades 8 within a single one of the stages 6, or alternatively, may correspond to multiple blades within the single stage. The current and/or the prior images (or videos) may correspond to a complete or partial view of a blades 8. In at least some embodiments, the images (or videos) may even correspond to multiple ones of the blades 8 from multiple ones of the stages 6, particularly for correlated damage across multiple one of the blades 8 in multiple of the stages 6.

Next, at a step 32, prior inspection data (prior images (or videos)) corresponding to current images (or videos) of the one or more blades 8 may be retrieved. Then, at a step 34, an image/video registration (e.g., alignment of the current and the prior images for performing a comparison therebetween) process may be performed to determine any corresponding similarities and/or differences between the current images (or videos) and the prior images (or videos). For conciseness of expression, the process has been explained with respect to only images. It will, however, be understood that the images may correspond to either one or more still images or video images (e.g., frames within the video).

Thus, at the step 34, a feature based approach for extracting features such as corner-like features and intensity gradient features, to determine any common features between the current and the prior images may be adopted. Alternatively, an image based approach where the entire current and the prior images are compared may be employed in some embodiments. In at least some other embodiments, a combination of the feature based and the image based approaches, or some other commonly employed technique for aligning (e.g., registering) and comparing the current and the prior images may be employed as well.

Techniques like Harris Corner Detector, SURF (Speeded Up Robust Features) and SIFT (Scale Invariant Feature Transform) may be employed for feature correspondence extraction or techniques such as Phase Correlation and NCC (Normalized Cross Co-relation) may be employed for image based comparison. All of the aforementioned techniques are well known in the art and, accordingly, for conciseness of expression, they have not been described here. Notwithstanding the fact that in the present embodiment, only the Harris Corner Detector, SURF, SIFT, Phase Correlation and NCC techniques for image comparison have been mentioned, in at least some embodiments, other types of techniques that are commonly employed for comparing images may be used.

Furthermore, the aforementioned registration techniques may be employed when the field-of-views (FOV) of the current and the prior images overlap with one another. Since the current and the prior images stored within the database 21 may not exactly be equivalent to one another (e.g., both of the images may correspond to the same blade(s) but one of the images may be rotated, for example, by a few degrees or translated a few inches relative to the other image), a warping technique to align the FOVs of both the current and the prior images prior to comparing those images may be performed. Generally speaking, warping may be performed by transforming the current and the prior images into matrix form, and by multiplying the prior image matrix with a mathematical transformation (e.g., a transformation corresponding to the difference of alignment between the current and the prior images) to obtain a warped image corresponding to the current image. Alternatively, the new image matrix may be multiplied by an inverse warping. Since the warping of current or prior images are entirely analogous, hereinafter, only one of the two approaches has been described. Warping techniques are well known in the art and, accordingly, for conciseness of expression, they have not been described here in detail. The database 21 may contain additional information beyond images such as model or serial numbers, part identification numbers, metrology information, etc.

The current image may then correspond to the warped prior image. Subsequent to warping, at a step 36, the current image and the warped prior image may be compared to determine any differences between the two images. In at least some embodiments, regions in the current image that have changed from the last inspection may be identified. In at least some embodiments, a thresholding technique or a classifier technique to compare the current and the prior images may be employed. In other embodiments, other techniques to compare those images may be utilized as well.

Next, at a step 38, it is determined whether any significant difference between the current image and the prior image has been found based upon the comparison of those images conducted at the step 36. A difference between the current and the prior images may be classified as significant if the differences, for example, circumference, area, texture, color, etc., are above a certain pre-set or adaptive threshold. Furthermore, the difference may correspond to either a significant defect being found in the current image compared to a prior image of an undamaged blade or, alternatively, the difference may correspond to a defect that has worsened from the prior image. Minor defects in the current image compared to the prior image may or may not be classified as significant, depending upon the threshold value mentioned above. Also, trends in defects may be determined to be significant if multiple prior images (videos) are being used. If the differences are indeed significant, then the process may proceed to a step 40, where the blade(s) corresponding to the current image may be flagged for repair.

Subsequent to repair at the step 40, the repaired blade(s) 8 may be photographed (or otherwise documented in some way) and may be stored in the database 21 at a step 42. In at least some embodiments, the database 21 may be updated by replacing the prior image with the current image or appending the current image along with the prior image for any usage in any future inspections of that blade(s). Information such as date of storing the current image into the database 21, may additionally be documented to determine a latest one of multiple images that may be stored within the database 21. It will also be understood that when multiple prior images of a blade are found, in at least some embodiments, the latest prior image corresponding to that blade may be employed for reference and inspection although in other embodiments, the current image may be compared to some or all of the prior images of that blade to determine the succession of any defect (or repair) within that blade. Furthermore, metadata such as types of defects, size of defects, location of defects, etc., may also be stored within the database 21 at the step 42.

If, at the step 38, no significant differences (e.g., minor or no change) between the current and the prior image are found, then the process may proceed directly to the step 42 where the database 21 may be updated with the warped current (or prior) image (if warping was performed) created at the step 34. Alternatively, if no warping was done at the step 34, then the current image "as-is" may be stored within the database 21 and the database may be updated. Again, the warped (or un-warped) current image may either replace one or more of the prior images already stored within the database 21 or it may be appended to the prior images.

After updating the database at the step 42, the process proceeds back to the step 26 where the updated database may be employed for performing any future inspections of the blades 8.

INDUSTRIAL APPLICABILITY

In general, the present disclosure sets forth a system and method for performing automated defect detection by utilizing data from previous inspections. A current image of one or more blades or other component is compared with the corresponding image(s) of those blade(s) stored within a database from prior inspections. To compare the two images, a warping technique to align or register the current image to the prior image may be performed. Upon comparing those images, if any significant differences (e.g., above a pre-set threshold) are found, then those blade(s) or component(s) may be flagged for repair. If no significant differences are found, the warped or unwarped image may be stored within the database for future inspections.

By virtue of utilizing data from prior inspections, the present disclosure allows for a more robust diagnostic of an engine blade or other mechanical component by storing multiple images of that blade or component for the same location. These multiple images may allow for a more robust comparison with a current image and may provide a mechanism for determining whether any defect is getting worse or not. Furthermore, the aforementioned technique may be performed in an automated (or semi-automated) fashion, thereby relieving human inspectors from manually inspecting blades or components to at least a certain extent.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A method of performing automated defect detection by utilizing prior inspection data, the method comprising:
providing an image capture device for capturing and transmitting at least one current image of an object;
providing a database for storing at least one prior image from prior inspections;
registering the at least one current image with the at least one prior image utilizing at least one of a feature based approach and an image based approach, the feature based approach comprising extracting common features between the at least one current image and the at least one prior image, the extracting comprising performing one of a Harris Corner Detector, Speeded Up Robust Features, a Scale Invariant Feature Transform, a Phase Correlation, and Normalized Cross-Correlation;
comparing the registered at least one current image with the at least one prior image to determine a transformation therebetween; and
updating the database with the at least one current image.

2. The method of claim 1, wherein registering comprises at least one of warping the at least one current image to the at least one prior image and warping the at least one prior image to the at least one current image.

3. The method of claim 2, wherein warping aligns a field-of-view of the at least one current image and the at least one prior image.

4. The method of claim 3, further comprising updating the database with an image created by warping.

5. The method of claim 1, further comprising accessing the database to retrieve at the least one prior image before registering the at least one current image to the at least one prior image.

6. The method of claim 5, wherein the database can be accessed manually by a user input.

7. The method of claim 5, wherein the database can be accessed automatically by an automatic retrieval tool.

8. The method of claim 1, wherein comparing the at least one current image with the at least one prior image comprises determining whether a difference between the at least one current image and the at least one prior image is above a preset threshold.

9. The method of claim 8, wherein if the difference is above a threshold, the object corresponding to the at least one current image is flagged for repair.

10. The method of claim 9, wherein the database is updated with at least one of the at least one image of the repaired object and at least one of the current image of the object.

11. The method of claim 1, wherein the image capture device is at least one borescope.

12. A system for performing automated defect detection, the system comprising:
an image capture device for capturing and transmitting current images of one or more components of a machine;
a database for storing prior images of the one or more components from prior inspections; and
a monitoring and analysis site in at least indirect communication with the image capture device and the database, the monitoring and analysis site capable of:
retrieving prior images from the database;
registering the current images with the prior images utilizing at least one of a feature based approach and an image based approach, the feature based approach comprising extracting common features between current images and the prior images, the extracting comprising performing one of a Harris Corner Detector, Speeded Up Robust Features, a Scale Invariant Feature Transform, a Phase Correlation, and Normalized Cross-Correlation; and
comparing those images with the current images of the same one or more components to determine a transformation therebetween.

13. The system of claim 12, wherein the machine is at least one of an engine and a turbine, each of the engine and the turbine comprising a plurality of stages, each of the plurality of stages having a plurality of blades.

14. The system of claim 12, wherein the monitoring and analysis site is at least one of an on-site and a remote site.

15. The system of claim 12, wherein the image capture device is a borescope.

16. A method of performing automated defect detection, the method comprising:
providing an image capture device capable of capturing and transmitting at least one current image of one or more blades of an engine;
providing a database capable of storing at least one prior image of the one or more blades of the engine from prior inspections;
accessing the database to retrieve the at least one prior image corresponding to the at least one current image;
registering the at least one current image to the at least one prior image utilizing at least one of a feature based approach and an image based approach, the feature based approach comprising extracting common features between the at least one current image and the at least one prior image, the extracting comprising performing one of a Harris Corner Detector, Speeded Up Robust Features, a Scale Invariant Feature Transform, a Phase Correlation, and Normalized Cross-Correlation;
comparing the registered at least one current image to the at least one prior image;
updating the database with the at least one current image.

17. The method of claim 16, wherein the database further stores information about type of defects, size of defects and location of defects of the one or more blades of the engine.

18. The method of claim 16, wherein the database stores at least one prior image corresponding to a single current image.

19. The method of claim 16, wherein the database further stores information about a date of updating the database with the at least one current image.

20. The method of claim 16, wherein comparing employs one of a thresholding technique or a classifier technique.

\* \* \* \* \*